United States Patent [19]

Muramatsu et al.

[11] Patent Number: 5,602,615
[45] Date of Patent: Feb. 11, 1997

[54] PHOTOMETRIC DEVICE TO DETERMINE A CORRECT PHOTOMETRIC VALUE OF A SPOT PHOTOMETRIC REGION

[75] Inventors: Masaru Muramatsu, Kawasaki; Shinichi Tsukada, Toride, both of Japan

[73] Assignee: Nikon Corporation, Tokyo, Japan

[21] Appl. No.: 499,709

[22] Filed: Jul. 7, 1995

[30] Foreign Application Priority Data

Nov. 16, 1994 [JP] Japan .................................. 6-281906

[51] Int. Cl.$^6$ .................................................. G03B 7/08
[52] U.S. Cl. ............................................ 396/228; 396/234
[58] Field of Search ..................................... 354/425, 426, 354/429, 432, 478; 356/222; 348/188, 364, 365, 366, 254, 241, 187

[56] References Cited

U.S. PATENT DOCUMENTS

| | | | |
|---|---|---|---|
| 4,476,383 | 10/1984 | Fukuhara et al. | 250/214 |
| 5,189,460 | 2/1993 | Hayakawa | 354/402 |
| 5,510,837 | 4/1996 | Takei | 354/432 |

*Primary Examiner*—W. B. Perkey

[57] ABSTRACT

A photometric device, used in an optical apparatus such as a camera, which includes photometric elements to measure photometric values according to plural regions of a subject field, and corrects the photometric values of photometric elements corresponding to specific regions within the plural regions based on the photometric values of regions outside the specific region and on previously set correction coefficients according to each region. The location of the specific regions on the subject field may be adjusted either manually or automatically based upon a focus adjustment state of a focus detection unit.

16 Claims, 4 Drawing Sheets

B[i,j]

PHOTOMETRIC DEVICE TO DETERMINE A CORRECT PHOTOMETRIC VALUE OF A SPOT PHOTOMETRIC REGION

BACKGROUND OF THE INVENTION

1. Field of the Invention

The present invention relates to a photometric device used in an optical apparatus such as a camera, and more particularly, to a photometric device which receives a photographic image from a photographic optical system of the optical apparatus and divides the photographic image into plural regions. The photometric device has a photometric sensor which receives the divided photographic image, and based upon photometric values of specific regions detected by the photometric sensor, the photometric device determines spot photometric values.

2. Description of the Related Art

A photometric device is known in which a subject imaged on a viewfinder screen is reimaged, by means of an optical system, on a photometric sensor having plural photometric elements. Photometry is performed by dividing the photographic picture plane into plural photometric regions. In this kind of photometric device, by using the photometric value of one of the photometric elements of the photometric sensor, an optical system and a photometric sensor for special use are not required, and spot photometry is possible to measure the light of a specific region of the photographic picture plane.

Nevertheless, in the above-noted conventional photometric device, there is a problem in that, due to the effects of stray light of internal reflections in the reimaging optical system, etc., a portion of the light incident on regions outside the spot photometric region penetrates into the spot photometric region, and an error arises in the spot photometric value.

SUMMARY OF THE INVENTION

Accordingly, it is a primary object of the invention to overcome the above-noted problems in the conventional photometric device.

It is a further object of the present invention to provide a photometric device, in an optical apparatus such as a camera, which eliminates the stray light of internal reflections in a reimaging optical system of the optical apparatus and detects a correct photometric value of a spot photometric region.

Additional objects and advantages of the invention will be set forth in part in the description which follows and, in part, will be obvious from the description, or may be learned by practice of the invention.

Objects of the invention are achieved by providing a photometric device which divides a subject field into plural regions and measures light incident on the plural regions with photometric elements arranged according to each region. The photometric device includes a calculating unit to correct the photometric value of photometric elements corresponding to a specific region, the photometric values of photometric elements corresponding to regions outside the specific region, and predetermined correction coefficients for each region which are based on the photometric value in the specific region.

According to a first aspect of the photometric device of the present invention, the specific region is set in the center of a subject field of the photometric device.

According to a second aspect of the photometric device of the present invention, additional specific regions are set in plural positions in the subject field of the photometric device.

Further, the photometric device according to the second aspect includes an operating member which selects various ones of the set specific regions. Still further, the photometric device according to the second aspect includes a focus detection unit which divides the photographic picture plane into plural focus detection regions and detects a focus adjustment state of the photographic optical system according to each focus detection region, and a region selection unit which selects at least one of the specific regions based on the focus adjustment state of the photographic lens.

The photometric device according to the first and second aspects has a correction coefficient according to each region, which is based on the photometric value in the specific region(s) when a light source has been disposed in each region outside the specific region(s).

By measuring photometric values using photometric elements according to plural regions of a subject field, photometric values of photometric elements which correspond to specific regions among the plural regions are corrected based on the photometric values of regions outside the specific regions and on a predetermined correction coefficient according to each region. Additionally, the correction coefficient according to each region may be predetermined based on the photometric values in specific regions when light sources are located in each region outside each specific region. According to the operation of this device, the effects of stray light of internal reflection, etc., in a reimaging optical system are eliminated, and the photometric values of specific regions, namely spot photometry regions, are correctly measured.

A specific region may be set in the center of the subject field, or additional specific regions may be set in plural positions of the subject field. In the case that plural specific regions are set in corresponding plural positions of the subject field, the various ones of the specific regions may also be selected by using an operating member, or specific regions may be automatically selected based on the focus adjustment state of the photographic lens detected according to the plural focus detection regions of the subject image plane.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
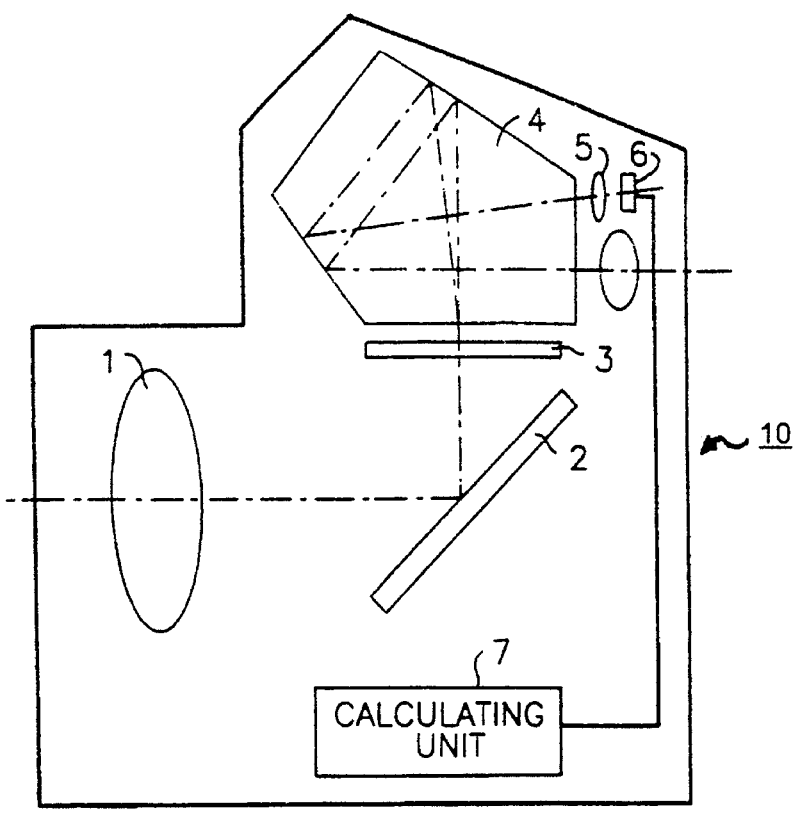
FIG. 1 is a functional block diagram showing a single lens reflex (SLR) camera having a photometric device according to a first embodiment of the present invention.

Reference will now be made in detail to the present preferred embodiments of the present invention, examples of which are illustrated in the accompanying drawings, wherein like reference numerals refer to like elements throughout.

A photometric device according to a first embodiment of the present invention will be described as it is used in a single lens reflex camera. FIG. 1 is a functional block diagram showing the single lens reflex camera 10 which includes the photometric device of the first embodiment.

Light rays from a subject pass through a photographic lens 1 and are reflected by a quick return mirror 2 to form an image on a viewfinder screen 3. The subject image imaged on the viewfinder screen 3 is reimaged on the photometric sensor 6 via a reimaging lens 5 and a pentaprism 4. The photometric sensor 6 measures the luminosity distribution of the subject image and outputs a photometric signal to a calculating unit 7. The calculating unit 7 performs an exposure calculation based on the photometric signal and sets the amount of exposure.

A photographic picture plane (not shown in the drawings) set on the viewfinder screen 3 is divided into 24 regions horizontally and 16 regions vertically, forming a total of 384 photometric regions $R[i,j]$, where $i=1$ through 24 and $j=1$ through 16.

The subject field corresponds to the photographic picture plane set on the view finder screen 3. The photometric sensor 6 has 384 photometric elements $S[i, j]$ respectively corresponding to these photometric regions, and measures the light for each photometric region to output photometric values $B[i, j]$. In the photometric device of the first embodiment, four regions of a center portion, $R[12, 8]$, $R[12, 9]$, $R[13, 8]$ and $R[13, 9]$, of the photographic picture plane set on the view finder screen 3 are designated as a spot photometric region Sp.

Figure 3:
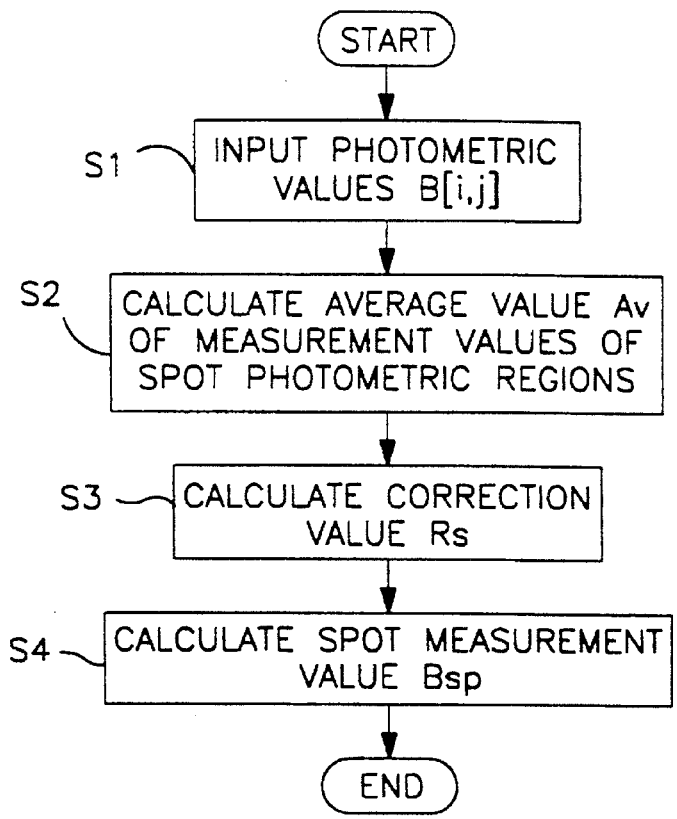
FIG. 3 is a flow chart showing a calculation process of spot photometric values performed by the photometric device of the first embodiment.

FIG. 3 is a flow chart showing a calculation process of a spot photometric value Bsp of the calculating unit 7. The operation of the photometric device of the first embodiment will be described using this flow chart.

In step S1, the photometric values $B[i, j]$ are input from the photometric sensor 6 to the calculating unit 7 for each photometric region. These photometric values $B[i, j]$ are non-logarithmically converted values. In step S2, an average value Av of the photometric values $B[12, 8]$, $B[12, 9]$, $B[13, 8]$ and $B[13, 9]$ of the four photometric elements $S[12, 8]$, $S[12, 9]$, $S[13, 8]$ and $S[13, 9]$ included in the spot photometric region Sp is calculated according to the following equation (1).

$$Av=\{B[12, 8]+B[12, 9]+B[13, 8]+B[13, 9]\}/4. \quad (1)$$

Next, in step S3, a correction value Rs is calculated by multiplying the photometric values $B[i, j]$ of the respective photometric elements by predetermined correction coefficients $E[i, j]$ for each photometric region according to equation (2). By taking each of the correction coefficients $E[12, 8]$, $E[12, 9]$, $E[13, 8]$ and $E[13, 9]$ of the spot photometric region Sp as equal to 0, the spot photometric region Sp is eliminated from the calculation of the correction value Rs.

$$Rs=\Sigma\{B[i, j]*E[i, j]\}. \quad (2)$$

Then, in step S4, the photometric value Bsp of the spot photometric region Sp is calculated by the following equation (3), based on the average value Av of the spot photometric region Sp and the correction value Rs.

$$Bsp=log_2(Av-Rs)+Ob, \quad (3)$$

where Ob is an offset correction value.

In this manner, the correct spot photometric value Bsp can be obtained from the average value Av of the spot photometric region Sp and the correction value Rs, thereby eliminating the effects of stray light of internal reflections within the reimaging optical system and the like.

Because the correction coefficients $E[i, j]$ differ according to the reimaging optical system and the camera itself, they are set beforehand by measurement for the kind of camera. This measurement is performed using a point light source, the photometric value of the spot photometric region Sp being determined when the point light source is located in each photometric region shown in FIG. 2. In the case that plural photometric elements correspond to a spot photometric region, the average of the photometric values may be found using the respective photometric elements. Theoretically, when the point light source is located outside the spot photometric region, the photometric value of the spot photometric region should be 0. However, as mentioned above, due to stray light such as internal reflections in the reimaging optical system, the photometric value is determined according to the luminosity of the point light source in the spot photometric region. Because of this, the photometric value of the spot photometric region is measured when a point light source having a standard luminosity is located in each region outside the spot photometric region, and the correction coefficients $E[i, j]$ of each photometric region are set, based on these photometric results. Further, the correction coefficients $E[i, j]$ are stored beforehand in a memory within the camera.

A photometric device according to a second embodiment of the present invention will be described in which a plurality of spot photometric regions are set in the photographic picture plane set on the viewfinder screen 3, and photometric values are determined of various ones of the plurality of spot photometric regions. The photometric device of the second embodiment is configured similarly to that of the first embodiment shown in FIG. 1, and its description is omitted.

Figure 4:
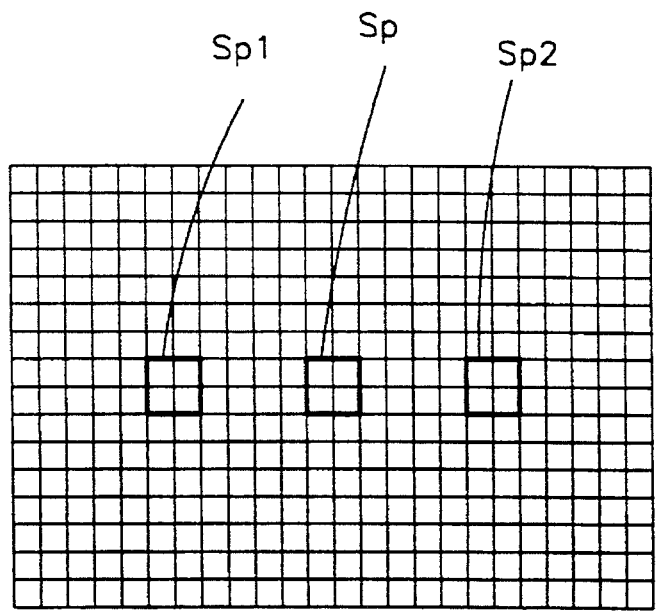
FIG. 4 is an enlarged front view of a photometric sensor of a photometric device and corresponding spot photometric regions according to a second embodiment of the present invention.

FIG. 4 is a diagram showing the spot photometric regions set in the photometric device of the second embodiment.

Figure 2:
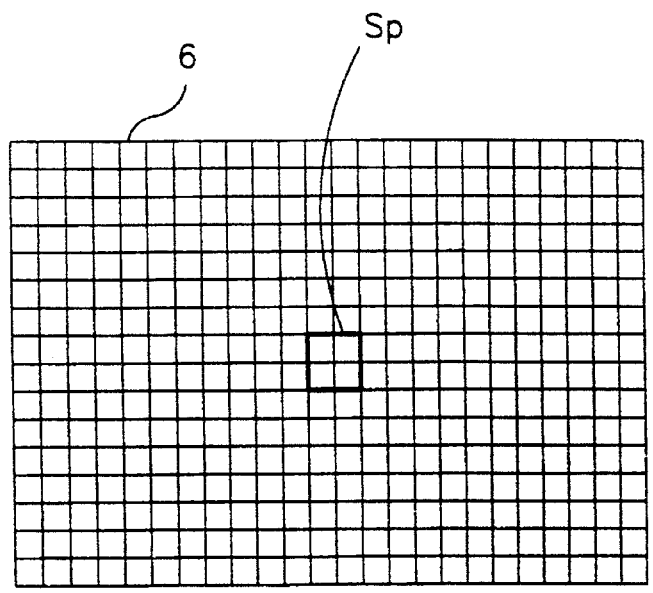
FIG. 2 is an enlarged front view of a photometric sensor of the photometric device and a corresponding spot photometric region according to the first embodiment of the present invention.

In the photometric device of the second embodiment, respective right-hand and left-hand spot photometric regions Sp1 and Sp2 are set, in addition to the central spot photometric region Sp ($R[12, 8]$, $R[12, 9]$, $R[13, 8]$ and $R[13, 9]$) set in FIG. 2. The left-hand spot photometric region Sp1 comprises the four regions $R[6, 8]$, $R[6, 9]$, $R[7, 8]$ and $R[7, 9]$, and the right-hand spot photometric region Sp2 comprises the four regions $R[18, 8]$, $R[18,9]$, $R[19, 8]$ and $R[19, 9]$.

Figure 5:
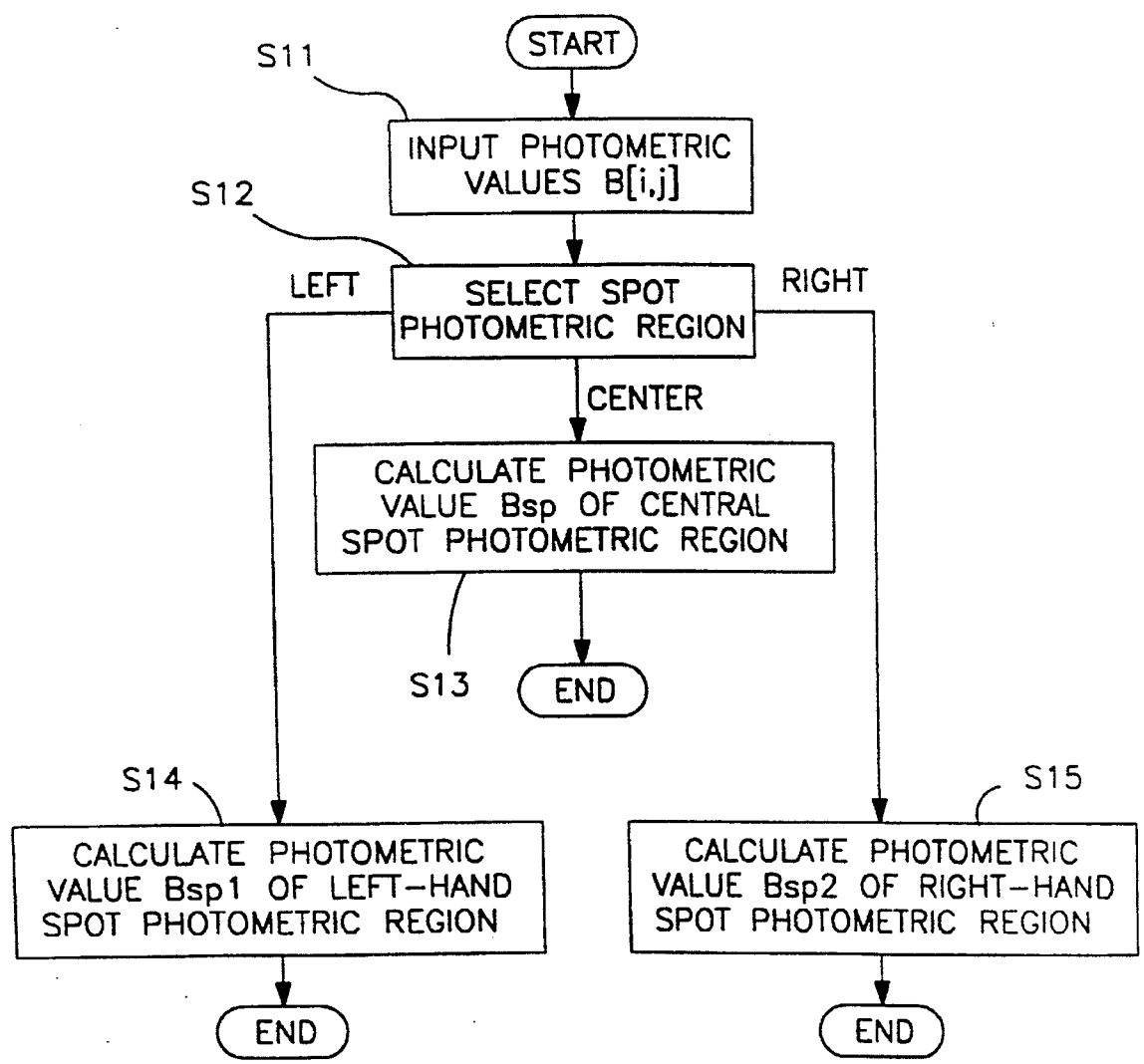
FIG. 5 is a flow chart showing a calculation process of spot photometric values performed by the photometric device of the second embodiment.

FIG. 5 is a flow chart showing a calculation process for the spot photometric values of the spot photometric regions Bsp, Bsp1 and Bsp2 of the calculating unit 7.

In step S11, the photometric values B[i, j] are input from the photometric sensor 6 to the calculating unit 7 for each photometric region. These photometric values B[i, j] are non-logarithmically converted values. Continuing, in step S12, a spot region selection switch, not shown in the drawing, is used to determine which spot photometric region is selected among the central spot photometric region Sp, the left-hand spot photometric region Sp1 and the right-hand spot photometric region Sp2. If the central spot photometric region Sp is selected, the routine proceeds to step S13, and the central spot photometric value Bsp is determined by the subroutine shown in FIG. 3.

Figure 6:
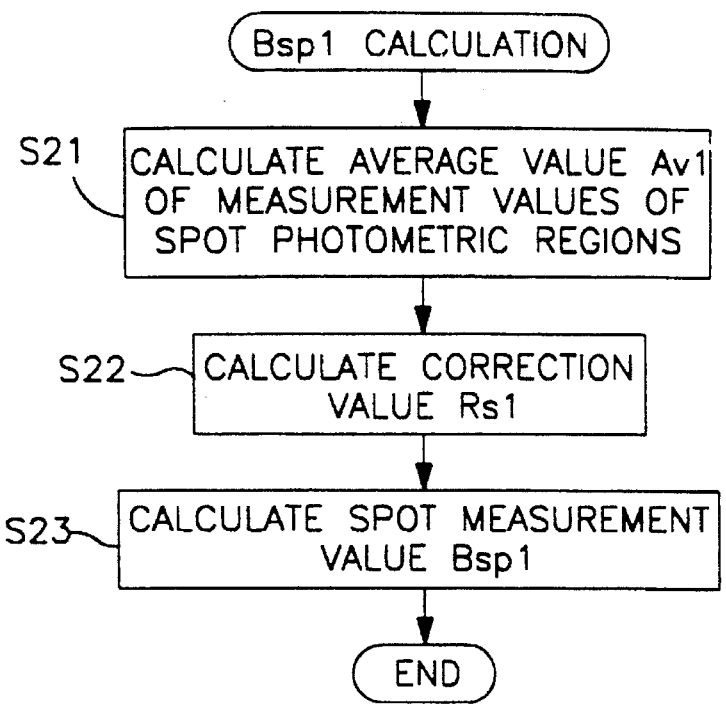
FIG. 6 is a flow chart showing a calculation process of spot photometric values determined by a left-hand side of the photometric sensor of the second embodiment.

If the left-hand spot photometric region Sp1 is selected, the routine proceeds to step S14, and the left-hand spot photometric value Bsp1 is determined by the subroutine shown in FIG. 6.

Figure 7:
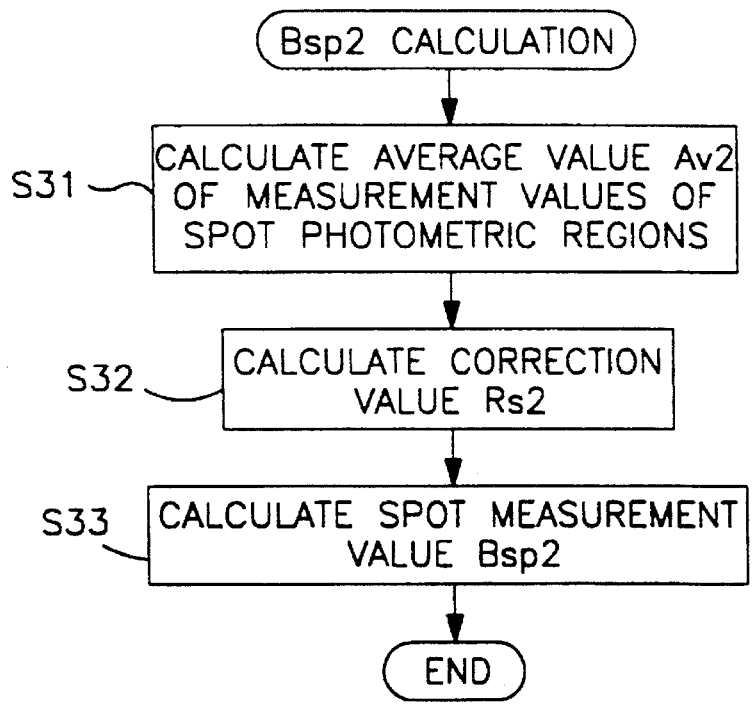
FIG. 7 is a flow chart showing a calculation process of spot photometric values determined by a right-hand side of the photometric sensor of the second embodiment.

If the right-hand spot photometric region Sp2 is selected, the routine proceeds to step S15, and the right-hand spot photometric value Bsp2 is determined by the subroutine shown in FIG. 7. The calculation process of the central spot photometric value Bsp is similar to the sequence described for the photometric device of the first embodiment, and its description is omitted.

FIG. 6 is a flow chart showing a calculation process of the photometric value Bsp1 of the left-hand spot photometric region Sp1. In step S21, the average value Av1 of the photometric values $B[6, 8]$, $B[6, 9]$, $B[7, 8]$ and $B[7, 9]$ of the four photometric elements $S[6, 8]$, $S[6, 9]$, $S[7, 8]$ and $S[7, 9]$ included in the left-hand spot photometric region is calculated according to the following equation (4).

$$Av1=\{B[6, 8]+B[6, 9]+B[7, 8]+B[7, 9]\}/4. \tag{4}$$

Next, in step S22, a correction value Rs1 is calculated by multiplying the photometric values B[i, j] of the respective photometric elements by predetermined correction coefficients E1 [i, j] for each photometric region. Moreover, taking each of the correction coefficients E1 $[6, 8]$, E1 $[6, 9]$, E1 $[7, 8]$ and E1 $[7, 9]$ of the spot photometric region Sp1 as equal to 0, the spot photometric region Sp1 is eliminated from the calculation of the correction value Rs1.

$$Rs1=\Sigma\{B[i, j]*E1 [i, j]\}. \tag{5}$$

The correction coefficients E1 [i, j], as mentioned above, are set based on the photometric results of measuring the photometric value of the left-hand spot photometric region Sp1 when a point light source having a standard luminosity is located in each region outside the left-hand spot photometric region Sp1.

In step S23, the photometric value Bsp1 of the left-hand spot photometric region Sp1 is calculated by the following equation (6), based on the average value Av1 of the spot photometric region Sp1 and the correction value Rs1.

$$Bsp1=log2(Av1-Rs1)+Ob1, \tag{6}$$

where Ob1 is an offset correction value.

In this manner, the correct spot photometric value Bsp1 can be obtained from the average value Av1 of the left-hand spot photometric region sp1 and the correction value Rs1, thereby eliminating the effects of stray light of internal reflections within the reimaging optical system and the like.

FIG. 7 is a flow chart showing a calculation process of the photometric value Bsp2 of the right-hand spot photometric region Sp2.

In step S31, an average value Av2 of the photometric values $B[18, 8]$, $B[18, 9]$, $B[19, 8]$ and $B[19, 9]$ of the four photometric elements $S[18, 8]$, $S[18, 9]$, $S[19, 8]$ and $S[19, 9]$ included in the right-hand spot photometric region is calculated according to the following equation (7).

$$Av2=\{B[18, 8]+B[18, 9]+B[19, 8]+B[19, 9]\}/4. \tag{7}$$

Next, in step S32, a correction value Rs2 is calculated by multiplying the photometric values B[i, j] of the respective photometric elements by predetermined correction coefficients E2 [i, j] for each photometric region according to equation (8). Moreover, taking each of the correction coefficients E2 $[18, 8]$, E2 $[18, 9]$, E2 $[19, 8]$ and E2 $[19, 9]$ of the right-hand spot photometric region Sp2 as equal to 0, the right-hand spot photometric region Sp2 is eliminated from the calculation of the correction value Rs2.

$$Rs2=\Sigma\{B[i, j]*E2[i, j]\}. \tag{8}$$

The correction coefficients E2 [i, j], as mentioned above, are set based on the photometric results of measuring the photometric value of the right-hand spot photometric region Sp2 when a point light source having a standard luminosity is located in each region outside the right-hand spot photometric region Sp2.

In step S33, the photometric value Bsp2 of the right-hand spot photometric region Sp2 is calculated by the following equation (9), based on the average value Av2 of the spot photometric region Sp2 and the correction value Rs2.

$$Bsp2=log2(Av2-Rs2)+Ob2, \tag{9}$$

where Ob2 is an offset correction value.

In this manner, the correct spot photometric value Bsp2 can be obtained from the average value Av2 of the right-hand spot photometric region Sp2 and the correction value Rs2, eliminating the effects of stray light of internal reflections within the reimaging optical system and the like.

In the photometric device of the second embodiment, one of the plural spot photometric regions is selected manually. However, the one spot photometric region may also be selected automatically, according to plural focus detection regions set in the photographic picture plane, by detecting a focus adjustment state of the photographic lens, and automatically selecting the one spot photometric region based on the focus adjustment state according to each focus adjustment region. For example, the photometric region corresponding to the focus detection region obtained showing the closest focus adjustment state from among the plural focus detection regions may be set as the one spot photometric region.

Further, the number, the location and the width of the spot photometric regions are not limited to positions shown in the above-noted first and second embodiments and may be changed.

According to the preferred embodiments of the present invention, photometric values are measured using photometric elements corresponding to plural regions of a photographic field. Photometric values of a number of the photometric elements corresponding to specific regions within the plural regions are corrected based on photometric values outside the specific regions and correction coefficients are set beforehand based upon each region. The effects of stray light of internal reflections, etc., within the reimaging optical system are eliminated, and the photometric values of selected spot photometric regions can be correctly measured.

In normal photography, because the principal subject is mostly located in the center of the photographic picture plane, a correct photometric value can be measured with respect to a principal subject by setting a specific region to be in the center of the photographic field.

Further, a photometric value can be measured with respect to an optional principal subject within the photographic picture plane, by setting a plurality of specific regions in a plurality of positions of the photographic field, and selecting one of the specific regions using an operating member.

A photometric value can be automatically measured with respect to a principal subject, by focusing the photographic lens, setting a plurality of specific regions in a plurality of positions of the subject field, and automatically selecting one of the specific regions based on a focus adjustment state of the photographic lens detected according to a plurality of focus detection regions of the photographic picture plane.

Although a preferred embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A photometric device, of an optical system, which divides a subject field, corresponding to a photographic picture plane, into a plurality of photographic regions, said photometric device comprising:

a photometric sensor having a plurality of photometric elements respectively corresponding to said plurality of photographic regions and measuring amounts of light incident upon said respective plurality of photographic regions, to determine photometric values for each photographic region; and a calculating unit to determine an average photometric value of a specific region comprising at least one of said plurality of photographic regions, and to correct the average photometric value based upon the photometric values of the photographic regions outside of the specific region and predetermined correction coefficients respectively associated with said plurality of photographic regions.

2. The photometric device as claimed in claim 1, wherein the specific region is in a center of the subject field.

3. The photometric device as claimed in claim 1, wherein the specific region is in a position other than a center of the subject field.

4. The photometric device as claimed in claim 1, wherein the photometric device sets a plurality of specific regions, each comprising at least one of said plurality of photographic regions, the photometric device further comprising an operating member to select one of said plurality of specific regions;

wherein said calculating unit determines an average photometric value of the selected specific region, and corrects the average photometric value based upon the photometric values of the photographic regions outside of the selected specific region and on predetermined correction coefficients respectively associated with said plurality of photographic regions.

5. The photometric device as claimed in claim 4, further comprising:

a focus detection unit to divide the photographic picture plane into a plurality of focus detection regions and detects a focus adjustment state of the optical system according to each focus detection region; and a region selection switch to select the one of said plurality of photographic regions as the selected specific region based upon the focus adjustment state.

6. The photometric device as claimed in claim 1, wherein the correction coefficient for each photographic region is based upon the average photometric value of the specific region when a point light source is directed towards only each of the photographic regions outside of the specific region.

7. The photometric device as claimed in claim 2, wherein the correction coefficient for each photographic region is based upon the average photometric value of the specific region when a point light source is directed towards only each of the photographic regions outside of the specific region.

8. The photometric device as claimed in claim 3, wherein the correction coefficient for each photographic region is based upon the average photometric value of the specific region when a point light source is directed towards only each of the photographic regions outside of the specific region.

9. The photometric device as claimed in claim 4, wherein the correction coefficient for each photographic region is based upon the average photometric value of the selected specific region when a point light source is directed towards only each of the photographic regions outside of the selected specific region.

10. The photometric device as claimed in claim 5, wherein the corrected coefficient for each photographic region is based upon the average photometric value of the selected specific region when a point light source is directed towards only each of the photographic regions outside of the selected specific region.

11. The photometric device as claimed in claim 1, wherein the corrected average photometric value (Bsp) is determined according to the following:

$Bsp = \Sigma \log_2(Av-Rs) + Ob$, wherein $Av$ = (sum of each of the photometric values of each of the photographic regions forming the specific region ÷ number of the photographic regions forming the specific region), $Rs = \Sigma$ (each of the photometric values of each of said plurality of photographic regions X the correction coefficient of said each photographic region), and $Ob$ is an offset correction value.

12. The photometric device as claimed in claim 11, wherein the correction coefficients are predetermined based upon the average photometric value of the specific region when a point light source is directed toward each of the photographic regions outside the specific region and the corrected coefficients of the photographic regions forming the specific region are set to 0.

13. The photometric device as claimed in claim 4, wherein the corrected average photometric value (Bsp) is determined according to the following:

$Bsp = \Sigma \log_2(Av-Rs) + Ob$, wherein $Av$ = (sum of each of the photometric values of each of the photographic regions forming the selected specific region ÷ number of the photographic regions forming the selected specific region), Rs=Σ (each of the photometric values of each of said plurality of photographic regions X the correction coefficient of said each photographic region), and Ob is an offset correction value.

14. The photometric device as claimed in claim 13, wherein the correction coefficients are predetermined based upon the average photometric value of the selected specific region when a point light source is directed toward each of the photographic regions outside the selected specific region and the corrected coefficients of the photographic regions forming the selected specific region are set to 0.

15. A photometric device, of an optical system, which divides a subject field, corresponding to a photographic picture plane, into a plurality of photographic regions, said photometric device comprising:

a photometric sensor having a plurality of photometric elements respectively corresponding to said plurality of photographic regions and measuring amounts of light incident upon said respective plurality of photographic regions, to determine photometric values for each photographic region; and a calculating unit to determine an average photometric value of a specific region comprising at least one of said plurality of photographic regions, and to correct the average photometric value based upon calculations of the average photometric value of the specific region determined when a point light source is directed toward each of the photographic regions outside the specific region.

16. The photometric device as claimed in claim 15 wherein the corrected average photometric value (Bsp) is determined according to the following:

Bsp=Σlog$_2$(Av−Rs)+Ob, wherein

Av=(sum of each of the photometric values of each of the photographic regions forming the specific region÷number of the photographic regions forming the specific region), Rs=Σ (each of the photometric values of each of said plurality of photographic regions X a correction coefficient of said each photographic region), and Ob is an offset correction value;

wherein the correction coefficients are based upon the calculations of the average photometric value of the specific region determined when a point light source is directed toward each of the photographic regions outside the specific region.

* * * * *